G. SCOTT'S
"COMBINATION SCALE"
No. 116999
PATENTED JUL 11 1871
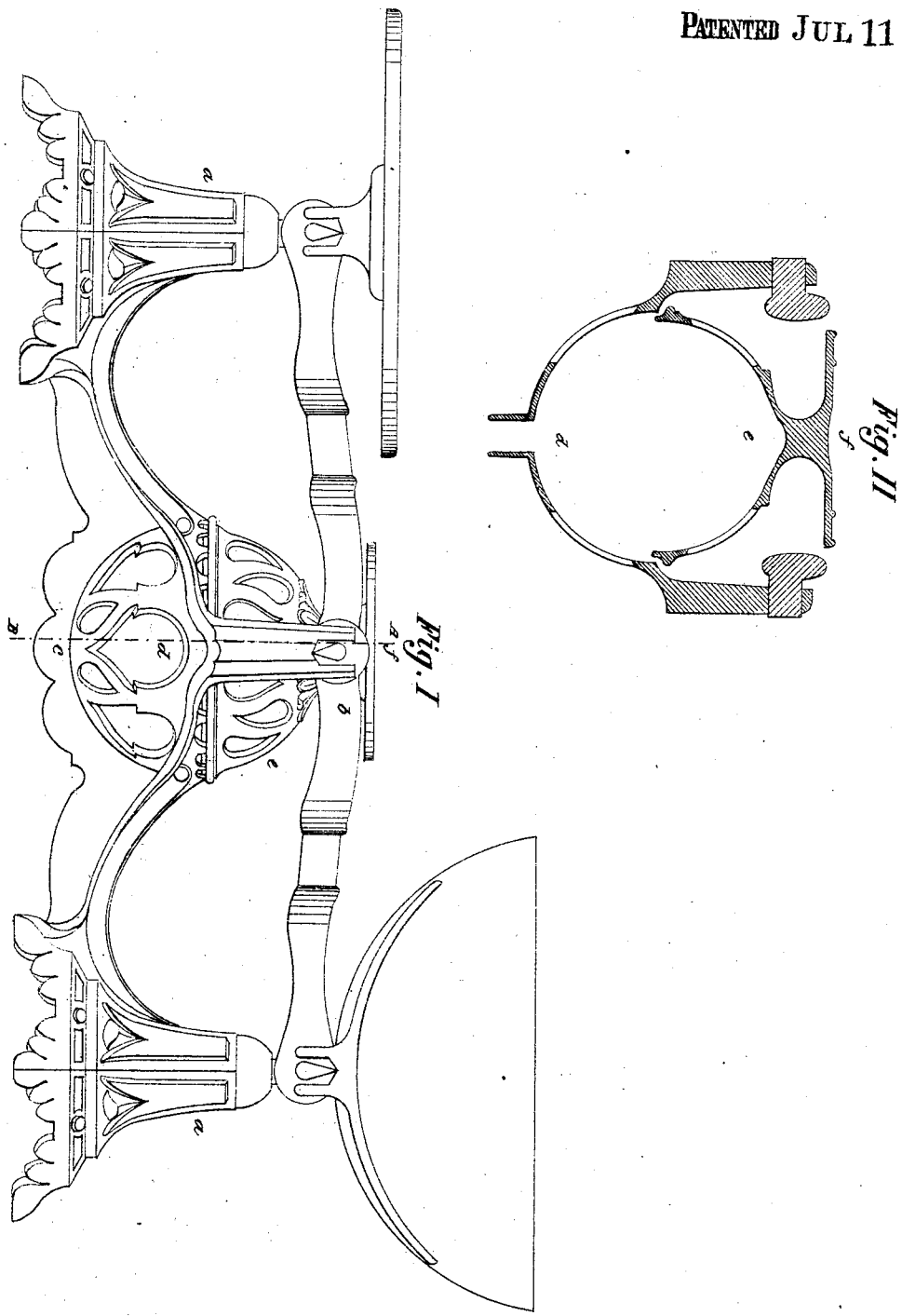
WITNESSES
Charles Legge
A. B. Muir
INVENTOR
George Scott

UNITED STATES PATENT OFFICE.

GEORGE SCOTT, OF MONTREAL, CANADA, ASSIGNOR TO HUBERT R. IVES AND ROGER N. ALLEN, OF SAME PLACE.

IMPROVEMENT IN WEIGHING-SCALES.

Specification forming part of Letters Patent No. 116,999, dated July 11, 1871.

*To all whom it may concern:*

Be it known that I, GEORGE SCOTT, of the city of Montreal, in the district of Montreal, in the Province of Quebec, Canada, machinist, have invented a new and useful Improved Combination Scale; and I do hereby declare that the following is a full, clear, and exact description of the construction and operation of the same, reference being had to the annexed drawing, where—

Figure I represents an elevation of the scale. Fig. II represents a section of the scale on line A B, Fig. I.

This invention relates to that class of scales which is provided with a twine-box and weight-plate; and consists in certain details of construction, which will be fully described hereinafter.

To enable others skilled in the art to make and use my invention, I will now proceed to describe fully its construction and manner of operation.

$a$ $a$ represent the standards of an ordinary pair of scales, which are united in the center by the stretcher $c$, which is constructed with a semi-spherical receptacle, $d$, as shown in Figs. I and II. Rising from the receptacle on each side are standards for supporting the center bar of the balance-beam $b$, which is provided with a central circular opening, through which projects the weight-plate $f$ attached to the semi-spherical cover $e$, as shown. The upper edge of the receptacle $d$ is provided with a series of semicircular notches or openings, through any one of which the twine may be drawn.

It will be observed that the twine-box and the plate $f$ for holding the weights are connected to the scale without increasing its size or interfering with its workings.

Having thus fully described my invention, what I claim as new, and desire to secure by Letters Patent, is—

The semi-spherical twine-receptacle $d$, provided with suitable openings for the withdrawal of the twine, in combination with the semi-spherical cover $e$ with plate $f$, the latter being adapted to hold the weights and serve also as a handle for raising the cover, the holder $d$ $e$ being located beneath the balance-beam, so that the twine may be withdrawn therefrom without interfering with the movements of the scale, as described.

Montreal, 22d October, 1870.

GEORGE SCOTT.

Witnesses:
 CHARLES LEGGE,
 A. B. MUIR.